United States Patent
Pradhan et al.

(10) Patent No.: US 6,446,257 B1
(45) Date of Patent: Sep. 3, 2002

(54) METHOD AND APPARATUS FOR PRE-ALLOCATION OF SYSTEM RESOURCES TO FACILITATE GARBAGE COLLECTION

(75) Inventors: Salil Pradhan, Santa Clara; Mark D. Hennecke, Cupertino; Michey N Mehta, San Jose; Ruslan Meshenberg, Santa Clara, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/244,320

(22) Filed: Feb. 4, 1999

(51) Int. Cl.$^7$ ............................................. G06F 717/01

(52) U.S. Cl. ...................................... 717/154; 707/206

(58) Field of Search ................................ 717/1, 7, 4, 9, 717/11, 5, 206, 108, 116, 140, 146–149, 151, 152, 154, 155; 707/206, 203, 103 R, 103 Y, 103 Z; 709/1, 104–107; 714/35; 711/207

(56) References Cited

U.S. PATENT DOCUMENTS

| | | | | |
|---|---|---|---|---|
| 4,558,413 A | * | 12/1985 | Schmidt et al. ............. | 364/300 |
| 4,807,120 A | * | 2/1989 | Courts ......................... | 364/200 |
| 4,922,414 A | * | 5/1990 | Holloway et al. .......... | 364/200 |
| 5,535,329 A | * | 7/1996 | Hastings ................ | 395/183.11 |
| 5,590,332 A | | 12/1996 | Baker .......................... | 395/205 |
| 5,764,989 A | * | 6/1998 | Gustafsson et al. ......... | 395/704 |
| 5,835,701 A | * | 11/1998 | Hastings ................ | 395/183.11 |
| 5,987,256 A | * | 11/1999 | Wu et al. .................... | 395/707 |
| 5,995,754 A | * | 11/1999 | Holzle et al. ............... | 395/709 |
| 6,151,618 A | * | 11/2000 | Wahbe et al. .................. | 709/1 |
| 6,206,584 B1 | * | 3/2001 | Hastings ................ | 395/183.11 |

OTHER PUBLICATIONS

Safe, Efficient Garbage Collection for C++, John R. Ellis and David L. Detlefs, Jun. 10, 1993, Copyright© 1993 by Digital Equipment Corporation and Xerox Corporation.*

Concurrent, Atomic Garbage Collection, David L. Detlefs, Nov. 1991, Department of Computer Science, Carnegie Mellon University, Pittsburgh, Pennsylvania.*

Object–Oriented Compiler Construction, Jim Holmes, Bethel College, MN 1995.*

(List continued on next page.)

*Primary Examiner*—Kakali Chaki
(74) *Attorney, Agent, or Firm*—Christine H. Smith (57) ABSTRACT

A generational garbage collection tool and method for a computer system that pre-allocates computer resources during compile-time for later use by a generational garbage collector at run-time. The invention reduces the overall cost of dealing with long-lived objects and thereby allows a generational garbage collector to focus deallocation efforts on young objects, which are more likely to be dead.

The present embodiment reduces pause time to a level that does not disturb interactive users. The embodiment allocates space for interior pointers at compile-time when the location of interior pointers is known and thereby facilitates generational garbage collection. By enabling the use of threaded interior pointers during generational garbage collection, live object relocation is improved by requiring an update to one pointer instead of updating each pointer that references an object. The present embodiment identifies the pointers that may be updated due to generational garbage collection, and by selectively allocating space to only those pointers that may be accessed during generational garbage collection and not all pointers, computer resources are saved. Further, the present embodiment may include locking information in the pointer to determine whether the object is presently being updated and is therefore locked.

18 Claims, 10 Drawing Sheets

OTHER PUBLICATIONS

The Annotated C++Reference Manual, ANSI Base Document, Margaret A. Ellis & Bjarne Stroustrup, 1989, AT&T Bell Laboratories, Murray Hill, New Jersey.*

Richard Jones & Rafael Lins, "Garbage Collection—Algorithms For Automatic Dynamic Memory Management", John Wiley & Sons, Copyright 1996, pp. 143–181.

Richard Jones & Rafael Lins, "Garbage Collection—Algorithms For Automatic Dynamic Memory Management", John Wiley & Sons, Copyright 1996, pp. 107–109.

"The Memory Management Glossary", (visited Dec. 10, 1998), <http://www.harlequin.com/mm/refere . . . ml#generational.garbage.collection>, pp. 1–5.

"Uniprocessor Garbage Collection Techniques," by Paul R. Wilson, <ftp://ftp.cs.utexas.edu/pub/garbage/bigsurv.ps>, pp. 1–38.

* cited by examiner

METHOD AND APPARATUS FOR PRE-ALLOCATION OF SYSTEM RESOURCES TO FACILITATE GARBAGE COLLECTION

FIELD OF THE INVENTION

The present invention relates generally to a method and apparatus for software development tools and is directed more particularly to a generational garbage collection tool of a compiler system in a computer system.

BACKGROUND OF THE INVENTION

Compiler systems operating in a computer system may manage allocation of computer resources such as computer memory at compile-time or at run-time. One method of computer resource allocation is garbage collection which is the automatic management of dynamically allocated computer resources, or storage. By the technique of garbage collection computer resources occupied by data objects are reclaimed when the data object may not be accessed again by an executing program. The reclaimed data object is referred to herein as "garbage." It would be advantageous for garbage collection to accurately and effectively operate in a threaded environment and with objects that are referenced by interior as well as exterior pointers.

The term "compile-time" refers to the period of compilation before a computer program is loaded and executing on the computer system, and the term "run-time" refers to the period of compilation after the computer program is loaded and is able to execute on the computer system. The term "storage" refers herein to computer resources such as memory, and may be data or instructions used in executing a computer program.

A live object may be globally known. That is, procedures other than the one that created the object may access the object. Therefore, a garbage collector includes bookkeeping techniques to determine at run-time when an object is no longer live relative to any program that may attempt to access the object and this state is referred to herein as an object being "dead." This bookkeeping method may include a determination of a safe point of the program. The safe point therefore is a point during program execution where the execution of the objects of a program may be halted and garbage collection may be safely performed. That is, at a safe point the garbage collector may safely dispose of all unresolved pointers and program code related to a dead object without impairing the functionality of the programs when garbage collection has completed and the programs are executing again.

Live objects, and not garbage, are preserved by a garbage collector thereby ensuring that pointers are not directed at dead, deallocated objects. Further, the efficiency of access to live objects may be improved during garbage collection by relocating the objects to contiguous storage locations. Therefore, after relocation of a live object, and since there may be more than one pointer referencing the object, garbage collection may work with threading techniques to ensure that the relationship between all the pointers referencing the object is maintained while only updating one pointer. That is, the pointers may be threaded thereby requiring update of only one pointer after object relocation.

Garbage collectors have been inhibited by the problem of reclaiming system resources in a multi-threaded programming environment. It will be appreciated that the term "thread" refers to a linear control flow of an executing program, and in a multi-threaded environment, several execution paths in an executing program may be executing simultaneously. Recall that a garbage collector requires access to system resources to relocate objects. Therefore, when several threads are being executed, including a garbage collector thread and another thread, both threads may be halted if they are simultaneously attempting to access the same system resources. Since system resources typically may be allocated in a serial fashion, the simultaneous attempts to obtain system resources will not be satisfied and the program may be indefinitely halted in a deadlocked state.

Further, current garbage collectors have been inhibited by the problem of locating a true safe point. For instance, it has not been possible to accurately determine during run-time the safe point of programs with interior pointers, especially in a multi-threaded environment. It will be appreciated that interior pointers may traverse unpredictable paths and therefore make identification of live or dead objects difficult. Accordingly there is a need to improve garbage collection to enable safe access to interior pointers in thread-based programs.

SUMMARY OF THE INVENTION

An embodiment of the present invention includes a generational garbage collection tool and method for a computer system that pre-allocates computer resources during compile-time for later use by a generational garbage collector at run-time. A purpose of generational garbage collection is to reduce the overall cost of dealing with long-lived objects and thereby allow a generational garbage collector to focus deallocation efforts on young objects, which are more likely to be dead. Another purpose of generational garbage collection is to reduce pause time to a level that does not disturb interactive users. The term "pause time" refers herein to the time a program is halted due to garbage collection. The technique of generational garbage collection achieves both purposes by segregating objects by age, and by collecting older generations much less frequently than younger ones. Therefore, improving the efficiency and expanding the scope of generational garbage collection will improve the management and allocation of computer resources. The terms "garbage collector" and "generational garbage collector" will be used interchangeably herein.

Fundamental concepts of generational garbage collection are explained in, "Unprocessed Garbage Collection Techniques," by Paul R. Wilson. Also, garbage collection is explained in "Garbage Collection Algorithms for Automatic Dynamic Memory Management," by Richard Jones and Rafael Lins, 1996, John Wiley & Sons.

When an object is threaded and a pointer that references the object is interior, accurate allocation of space to facilitate run-time generational garbage collection is very difficult. Therefore, it is an object of the invention to allocate space for interior pointers at compile-time when the location of interior pointers is known and thereby facilitate generational garbage collection. By enabling the use of threaded pointers that reference objects for generational garbage collection, the resource savings of threads may be employed. More particularly, by enabling the use of threaded interior pointers during generational garbage collection, live object relocation is improved by requiring an update to one pointer instead of updating each pointer that references an object.

It will be appreciated that the terms "instructions," "data structures," and "data" may refer to values such as integer, real, or complex numbers; or characters. Alternatively, the values may be pointers that reference values. Therefore, a pointer provides direction to locate a referenced value. The term "interior pointer" refers to a pointer to a location within a program other than the starting point for the program execution. The term "object" refers herein to a structured data record that may include instructions that operate and execute in association with the compilation system. Further an object may include instructions at locations that may be referenced by pointers. It will be appreciated that objects may include encapsulation and inheritance features such as are used in object-oriented programming. Those skilled in the art will appreciate these techniques used in object-oriented programming.

It is another object of the invention to efficiently manage at compile-time the bookkeeping necessary to allocate storage to pointers for use during generational garbage collection. That is the present embodiment identifies the pointers that may be updated due to generational garbage collection, and by selectively allocating space to those pointers that may be accessed during generational garbage collection and not all pointers, computer resources are saved. More particularly, with reference to interior pointers the present embodiment allocates space at compile-time to hold offset information used to locate the initial address of an object. The term "offset" refers herein to a representation of the distance between the initial, first address location of the object and the location of data actually referenced. It will be appreciated that use of an offset allows interior pointers to reference the starting address of the object without reference to the actual location of the starting address. Further, with reference to exterior pointers, the present embodiment allocates space at compile-time to identify the pointer as exterior.

It is also an object of the invention to facilitate the location of a true safe point by accurately identifying interior pointers and allocating space for generational garbage collection at compile-time. Therefore, safe relocation of interior pointers is enabled and proper operation of the program after generational garbage collection is ensured.

It is also an object of the invention to ensure that during run-time a single update to an object is attempted at a time. Therefore, the present invention may include locking information in the pointer to determine whether the object is presently being updated and is therefore locked.

Other aspects and advantages of the present invention will become apparent from the following detailed description, taken in conjunction with the accompanying drawings, illustrating by way of example the principles of the invention.

DETAILED DESCRIPTION

In the following detailed description and in the several figures of the drawings, like elements are identified with like reference numerals.

Figure 1:
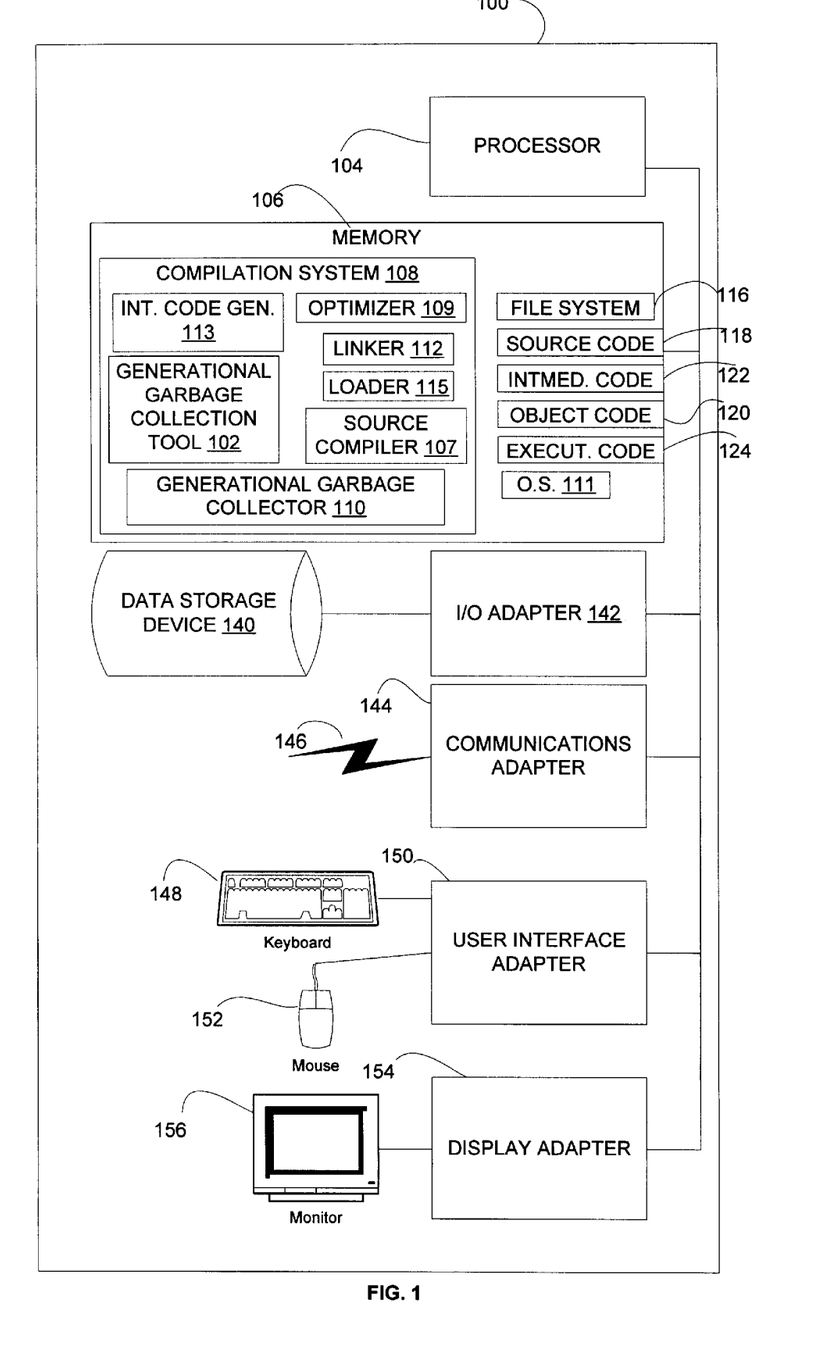
FIG. 1 is a block diagram that illustrates the generational garbage collection tool in the computer system.
Figure 2:
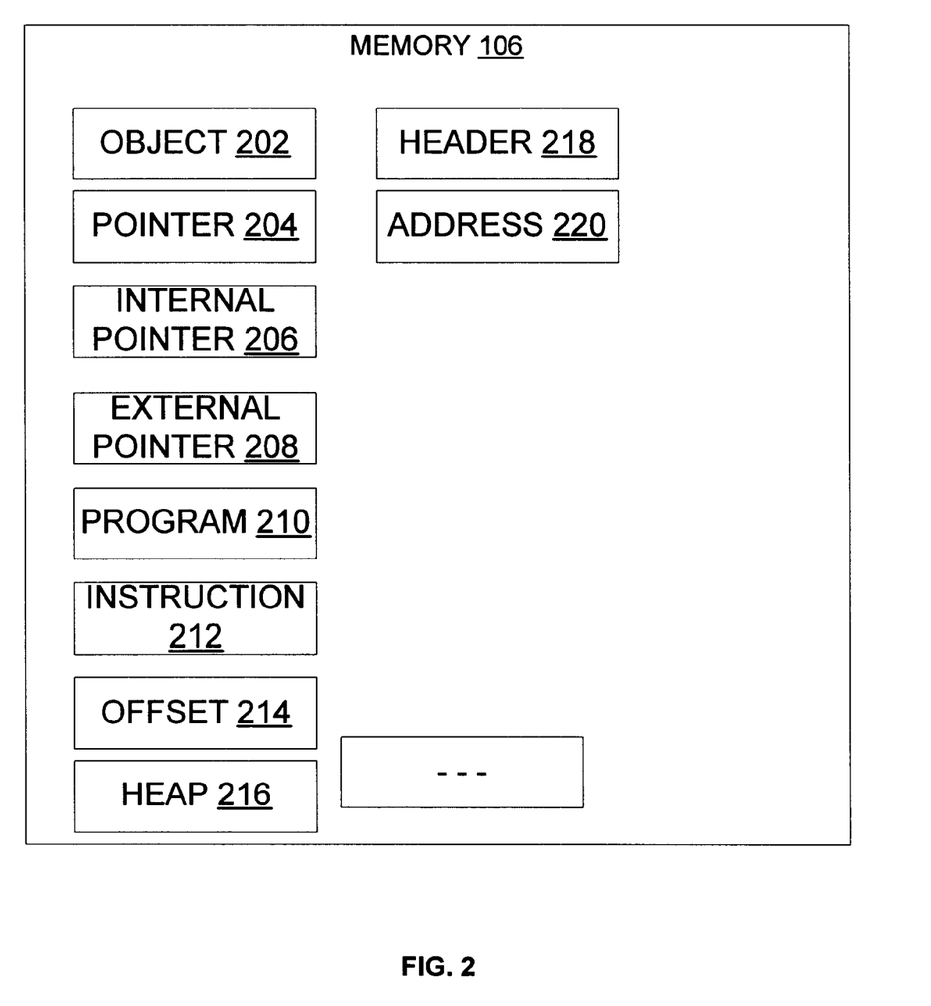
FIG. 2 is a block diagram that illustrates the memory that includes the data structures and procedures used by the generational garbage collection tool.

Broadly stated, FIG. 1 illustrates a generational garbage collection tool 102 that is an element of a compilation system 108 and operates in a computer system 100. The collection tool 102 enables the use of threaded objects 202 referenced by interior pointers 206 (as are shown in FIG. 2) for generational garbage collection. More particularly, the collection tool 102 facilitates accurate generational garbage collection by allocating space during compile-time for pointers 204 (as shown in FIG. 2) that will be accessed during garbage collection. That is, the collection tool 102 allocates space in the interior pointer 206 for an offset 214 from the exterior pointer 208 (as shown in FIG. 2) of the object 202 to the interior pointer 206, and space in the exterior pointer 208 to identify it as exterior.

It will be appreciated that a source compiler 107 may generate intermediate code 122 by processing source code 118. Further, the compilation of an intermediate file 122 may generate a plurality of object code files 120. Further, an object code file 120 is a computer file (such as a ".o" file) that may contain instructions 212 (as shown in FIG. 2) and data in a form that a linker 112 may use to create an executable code file 124.

More particularly, an intermediate code generator 113 creates object code files 120, and when the object code files 120 are combined the linker 112 may create executable code 124. Examples of executable files 124 include those having an extension of ".exe" operating under a DOS or Windows operating system or an "a.out" file that may operate under a UNIX® operating system.

Object code files 120 may be initially or temporarily located in the computer system 100, and may be relocated by the linker 112 for optimal execution in the computer system 100. Further, object code files 120 may be linked together by the linker 112 and loaded for execution by a loader 115.

It will be appreciated that "execute" refers to the process of manipulating software or firmware instructions for operation on the computer system 100. The term "code" refers to instructions 212 or data used by the computer system 100 for the purpose of generating instructions 212 or data that execute in the computer system 100. Further, "object code file" 120 and "object file" 120 may be used interchangeably herein. Also "intermediate code file" 122 and "intermediate file" 122 may be used interchangeably herein. "Executable code file" 124 and "executable file" 124 may be used interchangeably herein. "Source code file" 118 and "source file" 118 may be used interchangeably herein. Also, the terms "procedure" and "function" refer herein to units of program code that may be separately compiled and will be used interchangeably herein. Further, the term "module" refers to a combination of procedures or functions that are treated as one unit by the computer system 100. The term "program" refers herein to one or more procedures or files of code that are associated with each other for the purpose of executing as one unit on a computer system 100.

The present embodiment includes an optimizer 109 that generates object code 120 that includes optimization changes which may be dependent on a particular computer system 100. Further, these system-specific changes allow the optimizer 109 to generate object code 120 that is highly tailored to optimally run on a specific computer system 100. For example, code may be tailored to support different cache organizations or a different number of computer processors. Further, the optimizer 109 may make iterative changes to enhance further processing by the optimizer 109. In the present embodiment the collection tool 102 operates in conjunction with the optimizer 109 and the intermediate code generator 113 on an object 202 in the intermediate code 122 to allocate space in pointers 204 referencing the object 202. Further, a generational garbage collector 110, the linker 112, and the loader 115 may operate during run-time. The generational garbage collector 110 therefore advantageously uses the space allocated by the collection tool 102 to manage resources of the computer system 100 by relocating or deallocating objects 202.

The executable file 124 is created to operate on a particular computer system 100 and contains information used to load and execute a program 210 (as shown in FIG. 2). The executable file 124 may be executed by a loader 115, which operates to resolve any system-specific information such locations of addresses 220 (as shown in FIG. 2) that are necessary to execute the executable file 124. More particularly, the loader 115 works with an operating system (O.S.) 111 to determine the location in the memory 106 at which the executable file 124 may execute, and the loader 115 inserts the executable file 124 into the memory 106 at the appropriate location. As will be appreciated by those skilled in the art, information such about whether an object 202 may be relocated during generational garbage collection may be used by the generational garbage collector 110 while the executable code 124 is executing at run-time.

It will be appreciated that the instructions 212 may be operating instructions of the computer system 100 or addresses 220. The addresses 220 may be actual computer addresses 220 or virtual, symbolic addresses 220 that represent actual computer addresses 220. For instance, an actual computer address 220 may be a computer hardware register (not shown) or a location in the memory 106. It will be appreciated that the terms "virtual address" and "symbolic address" may be used interchangeably herein. The virtual address 220 is a pointer to the actual address 220. The instructions 212 and data are herein referred to as "instructions."

FIG. 1 further represents the computer system 100 that includes components such as the processor 104, the memory 106, a data storage device 140, an I/O adapter 142, a communications adapter 144, a communications network 146, a user interface adapter 150, the keyboard 148, the mouse 152, a display adapter 154, and a computer monitor 156. It will be understood by those skilled in the relevant art that there are many possible configurations of the components of the computer system 100 and that some components that may typically be included in the computer system 100 are not shown.

Further, it will be understood by those skilled in the art that the functions ascribed to the collection tool 102, or any of its functional files, typically are performed by the central processing unit that is embodied in FIG. 1 as the processor 104 executing such software instructions 212. The processor 104 typically operates in cooperation with other software programs such as the O.S. 111 and those included in the compilation system 108 including the collection tool 102. Henceforth, the fact of such cooperation among the processor 104 and the collection tool 102, whether implemented in software, hardware, firmware, or any combination thereof, may therefore not be repeated or further described, but will be implied. The O.S. 111 may cooperate with a file system 116 that manages the storage and access of files within the computer system 100. The interaction between the file system 116 and the O.S. 111 will be appreciated by those skilled in the art.

It will also be understood by those skilled in the relevant art that the functions ascribed to the collection tool 102 and its functional files, whether implemented in software, hardware, firmware, or any combination thereof, may in some embodiments be included in the functions of the O.S. 111. That is, the O.S. 111 may include files from the collection tool 102. In such embodiments, the functions ascribed to the collection tool 102 typically are performed by the processor 104 executing such software instructions 212 in cooperation with aspects of the O.S. 111 that incorporate the collection tool 102. Therefore, in such embodiments, cooperation by the collection tool 102 with aspects of the O.S. 111 will not be stated, but will be understood to be implied.

Computer memory 106 may be any of a variety of known memory storage devices or future memory devices, including any commonly available random access memory (RAM), cache memory, magnetic medium such as a resident hard disk, or other memory storage devices. In one embodiment the O.S. 111 and the collection tool 102 may reside in the memory 106 during execution in the computer system 100. Further, system resources may include the memory 106 and henceforth reference to the memory 106 will be understood to refer to system resources now known or available in the future.

Source code 118, intermediate code 122, object code 120, and executable code 124 may all reside in the memory 106 when the collection tool 102 is operating under the control of the O.S. 111. The compilation system 108 and the O.S. 111, may also reside in the memory 106 when the collection tool 102 is operating under the control of the O.S. 111. It will be appreciated that the compilation system 108 may include the following elements that enable the generation of executable code 124 that is capable of executing on the computer system 100. The compilation system 108 may include the optimizer 109, the intermediate code generator 113, the collection tool 102, the linker 112, the loader 115, the generational garbage collector 110, and the source compiler 107.

The collection tool 102 may be implemented in the "C" programming language, although it will be understood by those skilled in the relevant art that other programming languages could be used. Also, the collection tool 102 may be implemented in any combination of software, hardware, or firmware.

The data storage device 140 may be any of a variety of known or future devices, including a compact disk drive, a tape drive, a removable hard disk drive, or a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example the keyboard 148, the mouse 152, a touch-screen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the computer monitor 156, a printer, an audio speaker with a voice synthesis device, a network card, or a modem. Output devices such as the monitor 156 may communicate with the components in the computer system 100 through the display adapter 154. Input/output devices could also include any of a variety of known data storage devices 140 including a compact disk drive, a tape drive, a removable hard disk drive, or a diskette drive.

By way of illustration, the executable code 124 may typically be loaded through an input device and may be stored on the data storage device 140. A copy of the executable code 124 or portions of it, may alternatively be placed by the processor 104 into the memory 106 for faster execution on the computer system 100.

The computer system 100 may communicate with a network 146 through a communications adapter 144. The network 146 may be a local area network, a wide area network, or another known computer network or future computer network. It will be appreciated that the I/O device used by the collection tool 102 may be connected to the network 146 through the communications adapter 144 and therefore may not be co-located with the computer system 100. It will be further appreciated that other portions of the computer system, such as the data storage device 140 and the monitor 156, may be connected to the network 146 through the communications adapter 144 and may not be co-located.

FIG. 2 illustrates data structures and functions used by the collection tool 102 and that may be stored in the memory 106. The data structures and functions are listed in the general order of discussion with reference to the figures. The memory 106 may include the following:

- an object 202 that may be a structured data record;
- a pointer 204 that provides direction to locate a referenced object 202 or value;
- an interior pointer 206 that is a pointer 204 to a location within a program 210 other than the starting point for execution;
- an exterior pointer 208 that is a pointer 204 to the starting location for execution;
- a program 210 that is one or more procedures or files of code that are associated with each other for the purpose of executing as one unit on a computer system 100;
- an instruction 212 that may be operating instructions 212 of the computer system 100 or addresses 220;
- an offset 214 that represents the distance between the first address location of the object 202 and the location of data actually referenced;
- a heap 216 that is a portion of the memory 106 that allows dynamic allocation and deallocation of data structures;
- a header 218 that is included in the object 202 and may contain information about the object 202;
- an address 220 that represents the location of an instruction 212 or an object 202;
- as well as other data structures and functions.

Figure 3:
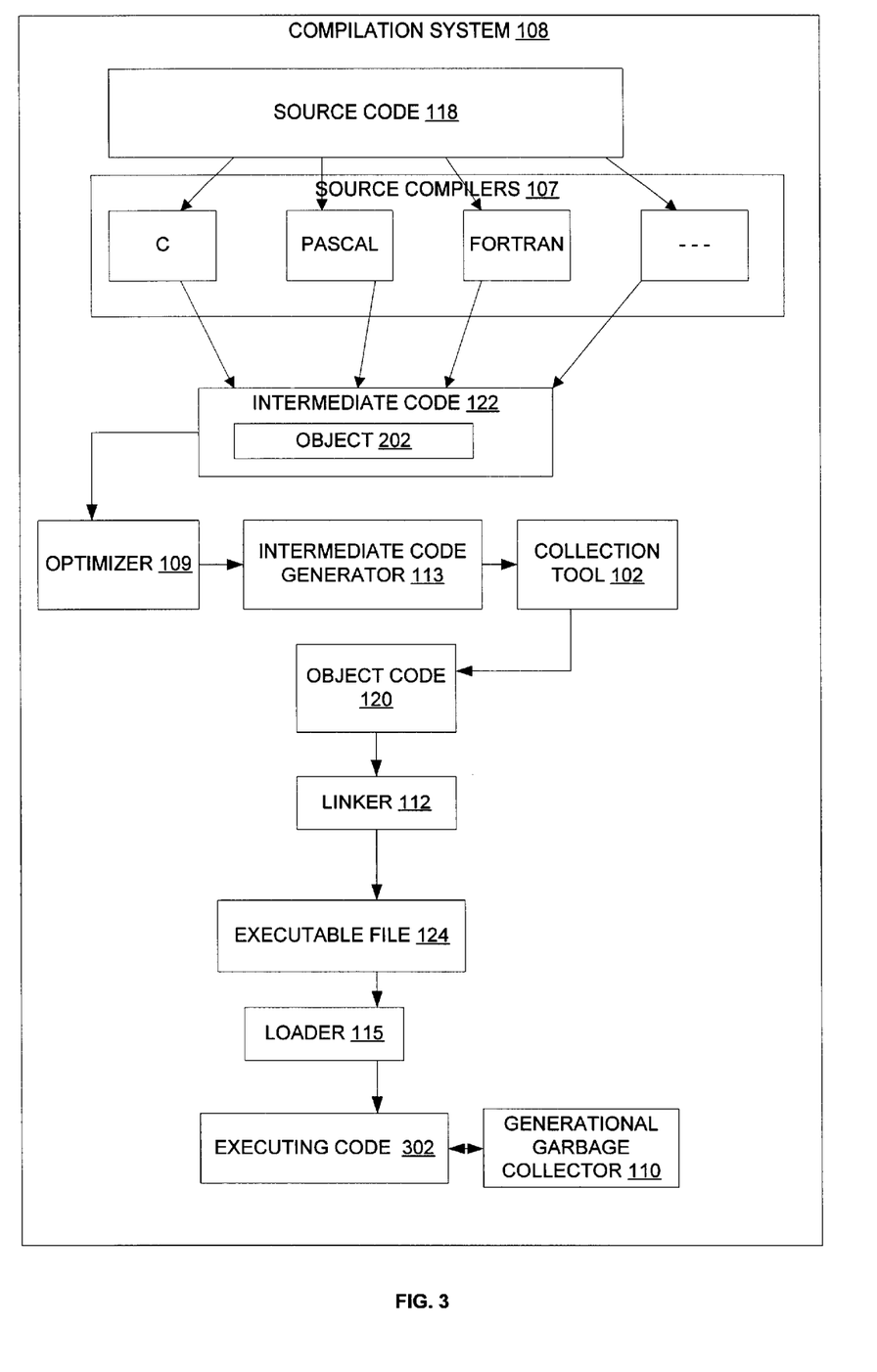
FIG. 3 illustrates portions of the operation of the compilation system.

FIG. 3 illustrates portions of the operation of the compilation system 108. A user creates source code 118 that may be written in any of a variety of known specific programming languages, such as the "C," Pascal, or FORTRAN languages, or future languages. A source compiler 107 processes a source code file 118 and thereby transforms the source code file 118 into an intermediate file 122. With respect to generational garbage collection, the user program source code 118 may be called the mutator since it may change the configuration of the memory 106 by providing objects 202 that may be relocated or deallocated by the generational garbage collector 110.

The collection tool 102 operates in cooperation with the optimizer 109 and the intermediate code generator 113 on the intermediate code 122. It is often unsafe to allocate the memory 106 during garbage collection while the program 210 is executing, and it is too expensive to allocate space for all the pointers 204 that reference an object 202 in preparation for generational garbage collection. Therefore, the collection tool 102 advantageously, by analysis of the intermediate code 122 at compile time identifies the possible interior pointers 206 to an object 202 that may be detected at safe points during run-time. In the present embodiment, the collection tool 102 may then reserve the next contiguous stack of the memory 106 and thereby enable storage of the offset 214 for the interior pointer 206. Further, the storage in the memory 106 may also be allocated by the collection tool 102 to label exterior pointers 208 as exterior. In the present embodiment, this storage in the memory 106 is used during run-time by the generational garbage collector 110 and not by other portions of the compilation system 108. Further, the loading of offset and exterior labeling information into the newly allocated storage may be accomplished by any technique for loading information into the memory 106, as is known in the art.

It will be appreciated that the present embodiment operates under the assumption that accurate references to interior pointers 206 are accessible and that each contiguous space in the memory 106 may be allocated. More particularly, it is assumed that determination of whether a pointer 202 may be live at a safe point is possible. The condition of liveness is illustrated in the code section in the Table 1 below.

TABLE 1

Live and Dead Instructions

| | |
|---|---|
| x = 0; | initialization of "x" implies that "x" is live |
| a = x * 10 | use of "x" implies that "x" is live |
| (no further use of "x") | implies that "x" is now dead |

Table 1 illustrates a value, "x" that is live while in use. For instance, when "x" is initialized or when "x" is multiplied by 10 it is live. However, when "x" is no longer used, it becomes dead for the purpose of generational garbage collection.

Typically computer storage may be the memory 106 and many software programs include directives, created by the user, that free or dispose of computer memory thereby reclaiming the memory 106 that was allocated for a specified data structure. Garbage collection allows reclamation of the memory 106 at run-time without requiring the user to explicitly free the memory 106. Therefore, the generational garbage collector 110 may operate in cooperation with the linker 112 and the loader 115 during run-time, or may operate in connection with a product marketed under the trademark JAVA VIRTUAL MACHINE™ 602 as discussed with reference to FIG. 6. It will be appreciated by those skilled in the art that the JAVA VIRTUAL MACHINE™ 602 may be included in the computer system 100, as discussed with reference to FIG. 6 and may cooperate with the compilation system 108.

Recall that the optimizer 109 may operate on the intermediate code file 122 to enhance the resulting object code file 120 for the purpose of producing an executable file 124 that executes efficiently. The linker 112 subsequently generates an executable file 124 by linking the associated object code files 120 and other files that may be necessary to ensure properly executing code 302. The loader 115 determines the location in the memory 106 at which the executable file 124 may execute, and the loader 115 inserts the executable file 124 into the memory 106 at the appropriate location thus enabling the execution of code as shown in element 302. The generational garbage collector 110 may operate by relocating or deallocating portions of the memory 106 related to the operation of the executing code 302. That is the object 202 may be generationally garbage collected during execution at run-time.

Alternatively, the JAVA VIRTUAL MACHINE™ 602 may cooperate with the loader 115 to interpret programs 210 for execution in the computer system 100. Further, the JAVA VIRTUAL MACHINE™ 602 is responsible for management of the allocation and deallocation of the memory 106 of programs 210 marketed under the trademark JAVA™ and may therefore cooperate with the generational garbage collector 110 that may also manage portions of the memory 106 during run-time.

Figure 4A:
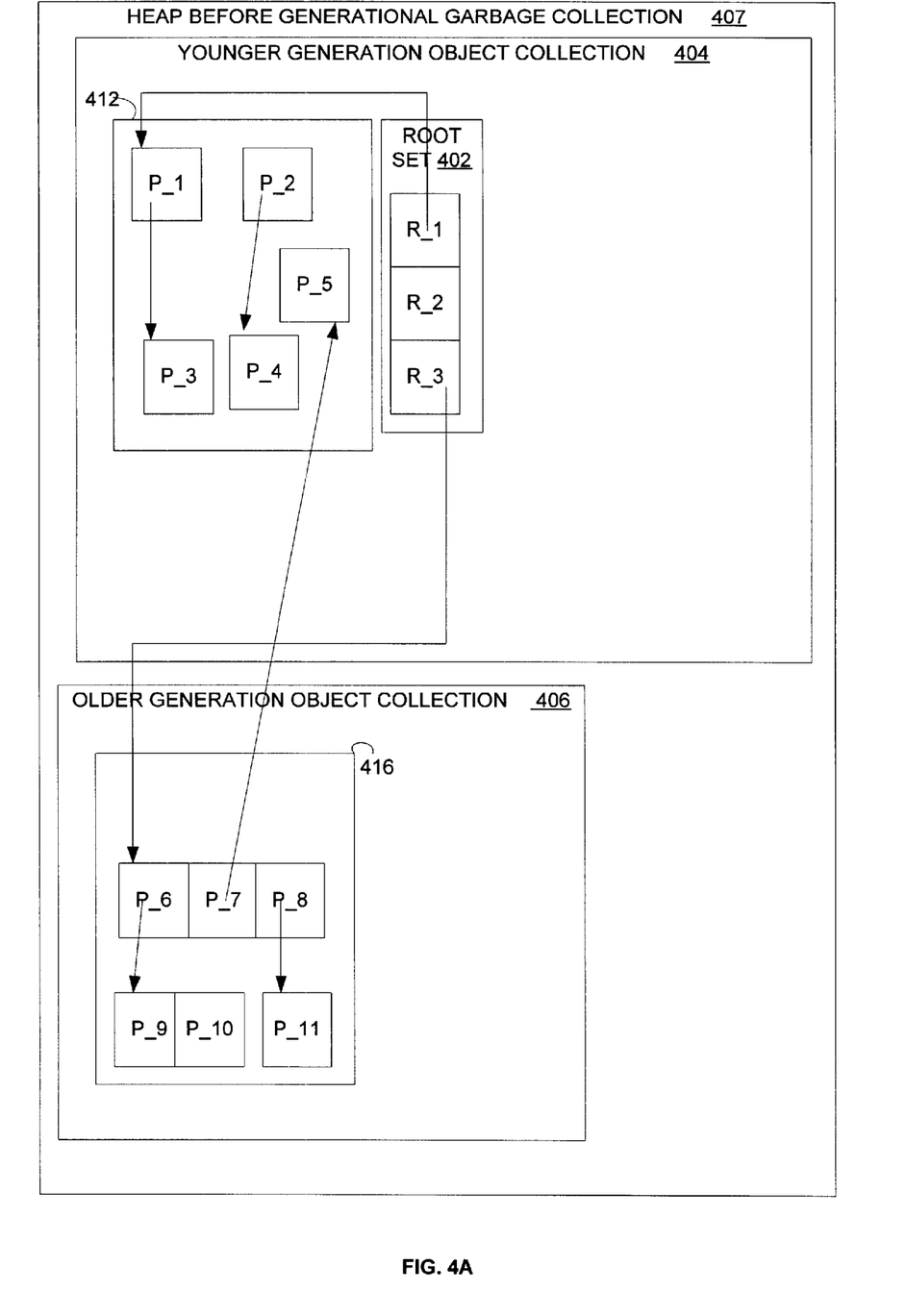
FIG. 4A illustrates the memory used by the heap before garbage collection.
Figure 4B:
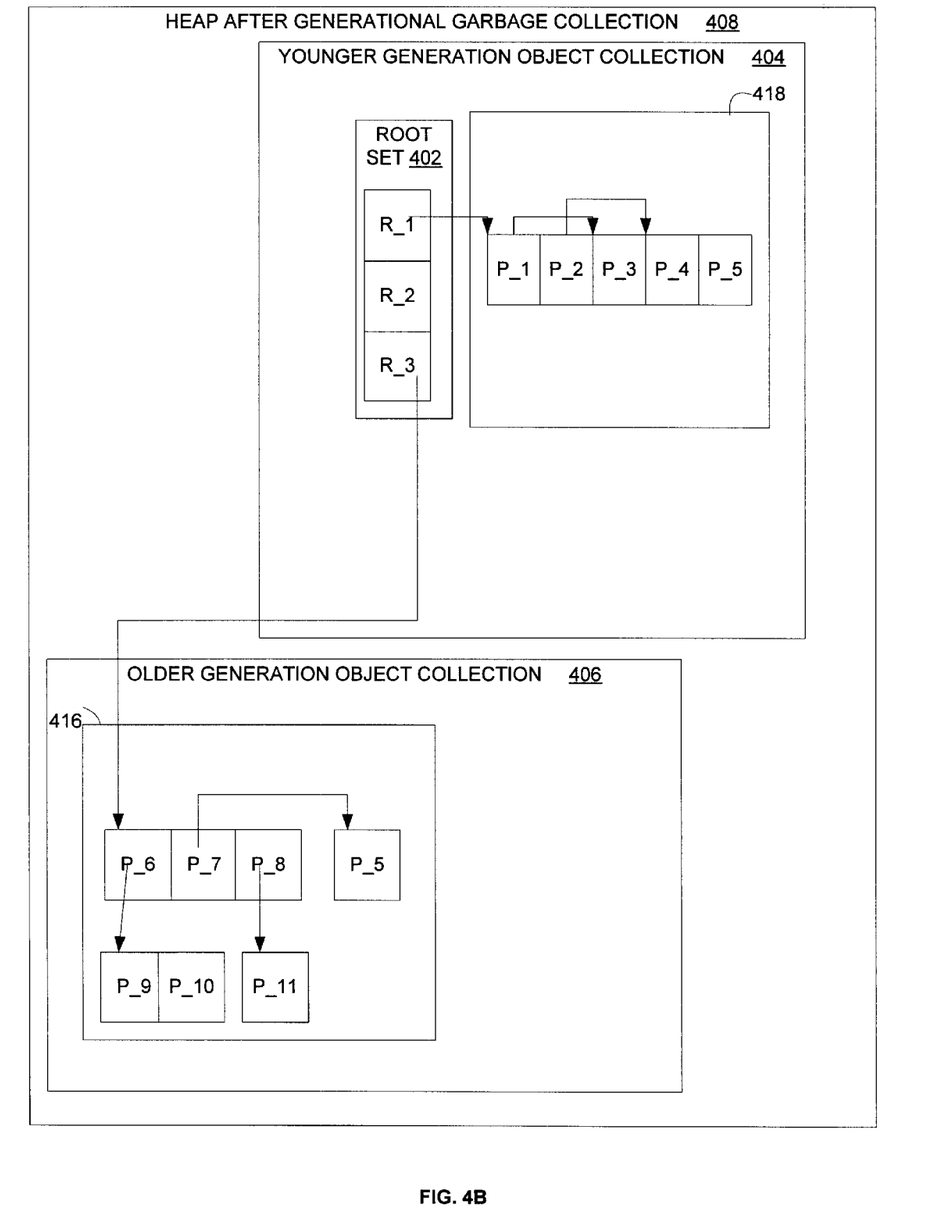
FIG. 4B illustrates the memory used by the heap after garbage collection.

Broadly speaking and as shown in FIGS. 4A and 4B, garbage collection works in conjunction with heap allocation, which is a technique for managing computer resources that allows allocation and deallocation of data structures in a heap 216 (as shown in FIG. 2) in any order. The term "heap" refers herein to a storage management technique that allows an object 202 to be dynamically allocated or deallocated, or the memory 106 used during heap storage management. Therefore by the use of a heap 216 dynamic data structures may outlive the software code in which they were created. The generational garbage collector 110 (as shown in FIG. 1) may divide a heap 216 into two or more groups segregated by age, and the groups are referred to herein as "generations."

FIG. 4A illustrates the memory 106 used by the heap 216 before garbage collection, as shown in element 408. Objects 202 (as shown in FIG. 2) are first allocated in the youngest generation object collection 404, but are promoted into an older generation object collection 406 if they survive long enough. Assuming that most objects 202 die young, the generational garbage collector 110 may concentrate efforts to deallocate objects 202 and to reclaim the memory 106 (as shown in FIG. 1) on the youngest generation since it is there that most recyclable storage space is to be found. Younger and older generation collections of objects 202 are discussed with reference to, "Uniprocessor Garbage Collection Techniques," at 32–36.

It will be appreciated that use of the heap 216 allows dynamically sized data structures and objects 202 in programs 210 (as shown in FIG. 2) thus alleviating problems with exceeding limits in the size of data structures during execution. Interior pointers 206 (as shown in FIG. 2) are especially difficult to track in a heap 216 since they reference locations of an object 202 that may change as the size of the object 202 changes. Therefore, the collection tool 102 (as shown in FIG. 1) enables safe dynamically sized data structure use during generational garbage collection by ensuring that interior pointers 206 to objects 202 may be safely accessed.

More particularly as shown in FIG. 4A the heap 216 before generational garbage collection 407 includes pointers 204 such as P_1, P_2, P_3, P_4, and P_5 as shown in element 412, that are members of the younger generation object collection 404; and pointers 204 such as P_6, P_7, P_8, P_9, P_10, and P_11 as shown in element 416, that are members of the older generation object collection 406. A root set 402 includes pointers 204 such as R_1, R_2, and R_3 that reference the starting location of an object 202 and are the initial pointers 204 (as shown in FIG. 2) in thread-based solutions. For example, R_1 points to P_1 that points to P_3; and R_3 points to P_6 that points to P_9. Further, before generational garbage collection, the pointers in element 412 are not located contiguously in the memory 106.

By approaching garbage collection generationally the memory 106 requirements may be reduced. For instance, rather than occasional but lengthy pauses to collect the entire heap 216, the youngest generation is collected more frequently. Since the youngest generation object collection 404 is small, pause times will be comparatively short. Furthermore, because older objects 202 are promoted out of younger generations, computer resources during run-time can be saved by not having to relocate these objects 202. Younger objects 202 generally die quickly, freeing up the memory 106 more often then older objects 202. Therefore, the generational garbage collector 110 (as shown in FIG. 1) avoids repeated relocation of objects 202 by segregating objects 202 by age, and collecting older objects 202 less often than the younger ones. It will be appreciated that the number of generational object 202 collections may be greater than two.

More particularly as shown in FIG. 4B the heap 216 after generational garbage collection 408 includes pointers 204 such as P_1, P_2, P_3, and P_4 as shown in element 418, that are members of the younger generation object collection 404 and are now located contiguously in the memory 106. Also, pointers 204 such as P_6, P_7, P_8, P_9, P_10 and P_11 as shown in element 416, remain members of the older generation object collection 406. Further, pointer P_5 has aged and is now a member of the older generation object collection 406 as shown in element 416. Pointer R_1 in the root set 402 continues to reference the starting location of P_1 in element 418; and R_3 references P_6 in element 416.

Figure 5A:
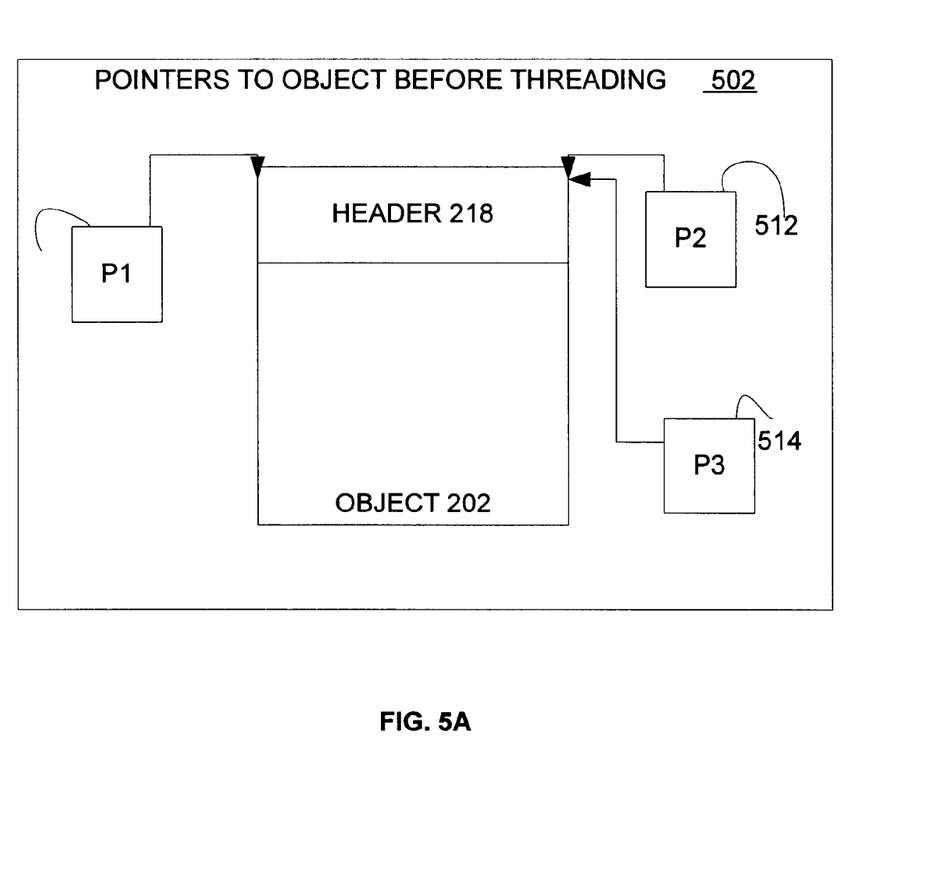
FIG. 5A illustrates the pointers referencing an object before threading.

As shown in FIG. 5A before threading there may be more than one pointer 204 that references an object 202. An object 202 may include a header 218. The header 218 may include information about the object 202 that allows proper execution of the object 202. For instance, the header may include information that enables translation of data in the object or the size of the object. An object 202 will be locked when it is being accessed and its location may be changed. More particularly, as shown in element 502 pointers 204 such as pointer P_1 510, pointer P_2 512, and pointer P_3 514 all point to the same object 202 at the header 218.

The header 218 may also contain information about whether the object is locked. For instance, an instruction 212 may include lock information and may be associated with the object 202 to ensure that generational garbage collection and other accesses to the object 202 to change its location are performed serially.

Figure 5B:
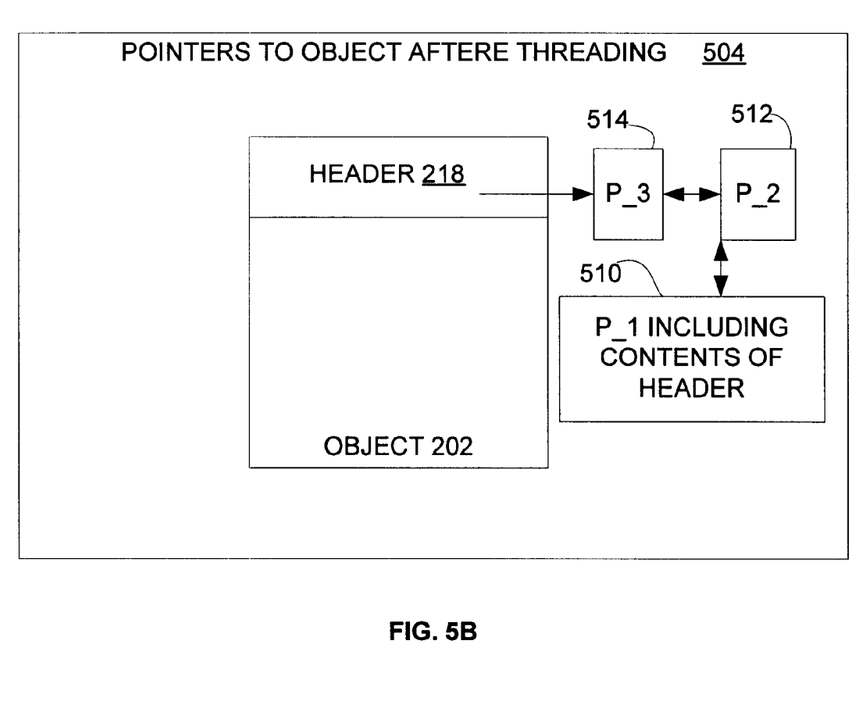
FIG. 5B illustrates the pointers referencing an object after threading.

As shown in FIG. 5B and in element 504, after threading the information in the header 218 has been relocated to pointer P_1 510, and there is a thread between the header 218, pointer P_1 510, pointer P_2 512, and pointer P_3 514. The header 218 of object 202 now merely references pointer P_3 514. Therefore, when the object 202 is relocated to a new location the thread of pointers 204 can be traversed without updating each pointer 204.

Figure 5C:
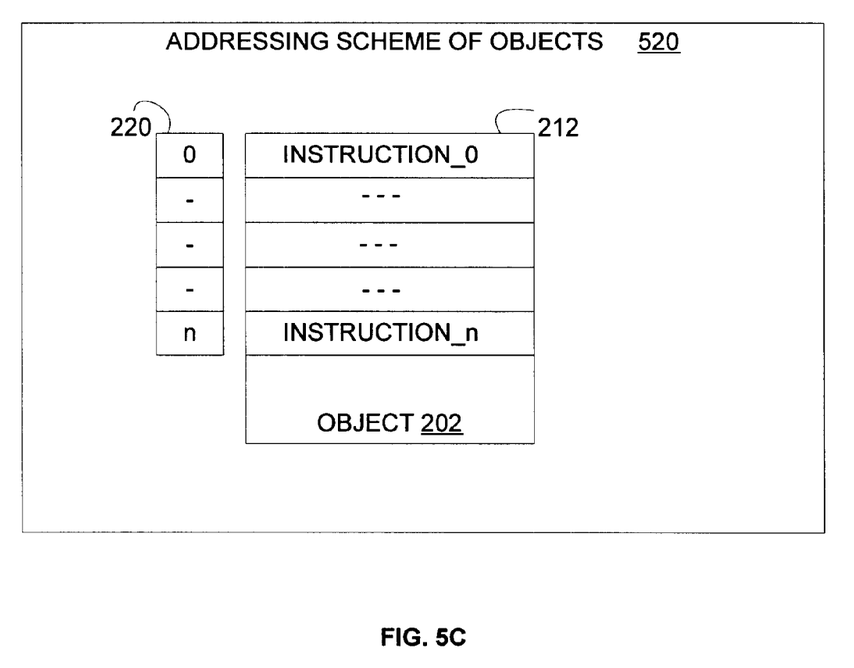
FIG. 5C is a block diagram that illustrates the addressing scheme of an object.

As shown in FIG. 5C, the object 202 may include instructions 212 that may be associated in a pre-defined order. Each instruction 212 has a corresponding address 220 that represents the location of the instruction 212. It will be appreciated that each address 220 may represent the virtual or actual location of the object 202.

Figure 5D:
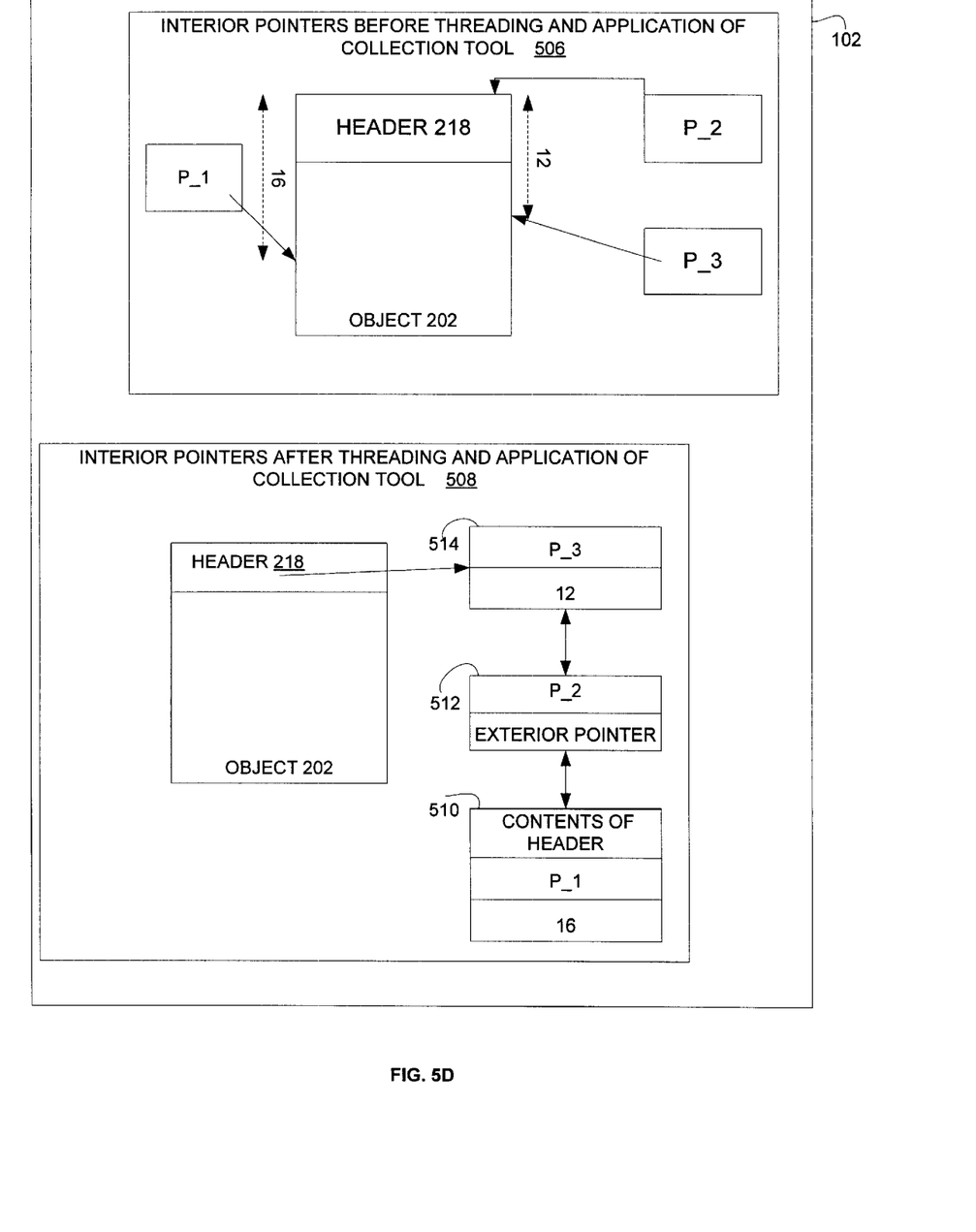
FIG. 5D is a block diagram that illustrates the collection tool.

As shown in FIG. 5D, the operation of the collection tool 102 can detect interior pointers 206 and exterior pointers 208 and can allocate space for the objects 202 and for the pointers 204 that reference them. More particularly in the present embodiment, the next contiguous locations after pointer P_3 514 and pointer P_1 510 are used to store the offset 214 from the starting address 220 of the object 202. For example as shown in element 506, the distance from the location of the interior pointer 206, pointer P_1 510, to the starting location of the object 202 is 16 units. Therefore as shown in element 508, "16" is stored in the memory 106 at the next contiguous location to pointer P_1 510.

Further as shown in element 506, the distance from the location of the interior pointer 206, pointer P_3 514, to the starting location of the object 202 is 12 units. Therefore as shown in element 508, "12" is stored in the memory 106 at the next contiguous location to pointer P_3 514, and the header 218 of the object 202 references the pointer P_3 514 that is the start of the thread of pointers 204 that reference the object 202.

Further, in the present embodiment newly allocated storage by the collection tool 102 in pointer P_2 512, which is an exterior pointer 208, is used to identify that pointer P_2 512 is an exterior pointer 208. Recall that as shown in element 506, an exterior pointer 208 points to the beginning address 220 of an object 202.

The collection tool 102 improves the efficiency of generational garbage collection in an amount proportional to the type of object 202 and program 210 that are executing. Also, since the storage space in the memory 106 is stored once at compile-time, multiple run-time executions of an object 202 that has been manipulated by the collection tool 102 advantageously benefits at each execution, thus resulting in additional savings in system resources.

Figure 6:
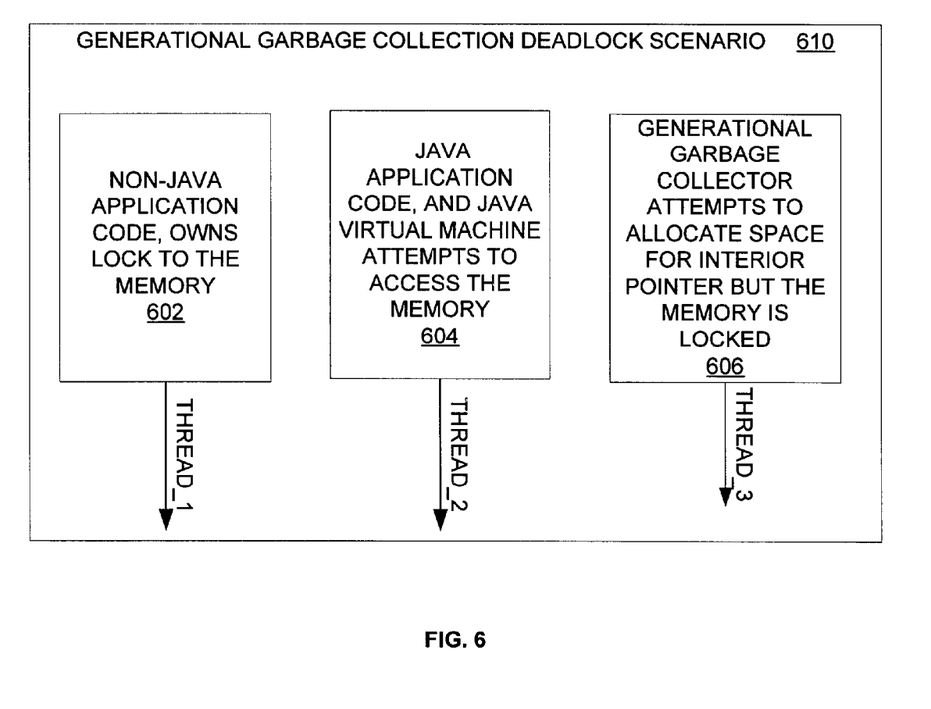
FIG. 6 is a block diagram that illustrates the potential for deadlock scenario that the collection tool reduces.

As shown in FIG. 6 and for purposes of illustration, the operation of JAVA™ application code and non-JAVA™ application code may create a potential deadlock due to contention for storage in the memory 106. The operation of the collection tool 106 (as shown in FIG. 1) advantageously reduces the possibility of a deadlock as a result of the operation of the generational garbage collector 110.

For instance, it will be appreciated by those skilled in the art, that unresolved system resource contention may occur when non-JAVA™ application code and JAVA™ application code are simultaneously executing. Since each application is managed independently, contention over allocation and deallocation of the memory 106 related to the same object 202 (as shown in FIG. 2) may occur. The generational garbage collector 110 halts execution of a program 210 (as shown in FIG. 2) while deallocating garbage, and transfer of control from the generational garbage collector 110 back to the program 210 execution may not occur if there is an unresolved access to the memory 106 attempted. Therefore, the program may remain halted.

More particularly, as shown in FIG. 6 the advantageous feature of the collection tool 102 will be evident in comparison to the previous method of allocating space for the interior pointers 206 that reference an object 202 during generational garbage collection. For instance, the non-JAVA™ application code may operate on Thread_1, as shown in element 602. The JAVA™ application code and the JAVA VIRTUAL MACHINE™ may operate on Thread_2 and may attempt to access the memory 106 as shown in element 604. Also as shown in element 606, the generational garbage collector 110 may simultaneously attempt to allocate the memory 106 for an interior pointer 206 and may encounter a lock related to the storage for the object 202 from Thread_1 or Thread_2.

Therefore, at a safe point the generational garbage collector 110 will try to halt execution of the program 210. Since the memory 106 related to the object 202 is already locked, the generational garbage collector 110 will not be able to complete the operation to access the memory 106. That is, while the generational garbage collector 110 is trying to allocate space for an interior pointer 206 that references the object 202 execution will be stalled due to existing contention for the memory 106. This will result in a deadlock related to access of the memory 106. The collection tool 102 advantageously allocates the memory 106 for generational garbage collection during compile-time thereby reducing the risk of deadlock.

Alternative Embodiments

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the collection tool are presented for purposes of illustration and description. They are not intended to be exhaustive or to limit the invention to the precise forms disclosed, obviously many modifications and variations are possible in view of the above teachings. Those skilled in the art will recognize that changes may be made in form and detail without departing from the scope of the invention. The invention is limited only by the claims.

What is claimed is:

1. A collection tool, in a computer system having resources, an object, and a compilation system; said collection tool comprising:

wherein said compilation system being operable during compile-time and during run-time;

said object operating in association with said compilation system at said compile-time; and said object being generationally garbage collected in association with said compilation system at said run-time;

an interior pointer referencing said object; and a portion of memory residing in said resources, said portion of memory being allocated for said interior pointer at said compile-time thereby facilitating said generational garbage collection of said object at said run-time by reference to said interior pointer.

2. The collection tool as set forth in claim 1, further comprising:

wherein said computer system being operable for threading; and said object being threaded thereby facilitating said generational garbage collection of said threaded object.

3. The collection tool as set forth in claim 1, further comprising:

wherein said object having a plurality of instructions in a pre-defined order;

a starting instruction being first in said pre-defined order;

an interior instruction being after said first instruction in said pre-defined order and said object pointer referencing said interior instruction of said object; and an offset instruction representing a distance between said starting instruction and said interior instruction and said offset instruction being stored in said resources for said object pointer, thereby facilitating safe said generational garbage collection of said object by reference to said object pointer.

4. The collection tool as set forth in claim 1 further comprising; said resources being selectively allocated for said object pointer when said object pointer will be generationally garbage collected at said run-time thereby selectively using said resources of said computer system.

5. The collection tool as set forth in claim 1, tool further comprising:
   wherein said object having a plurality of instructions in a pre-defined order;
   a first instruction being first in said pre-defined order and said object pointer referencing said first instruction; and
   an identification instruction representing said first instruction being referenced by said object pointer, and said identification instruction being stored in said resources for said object pointer, thereby facilitating safe said generational garbage collection of said object by reference to said object pointer.

6. The collection tool as set forth in claim 1, wherein said object having a lock instruction that identifies said object as locked when said object is being generationally garbage collected, thereby said object is serially generationally garbage collected at said run-time.

7. A method for pre-allocating resources in a computer system; said computer system having an object, and a compilation system; said method comprising:
   operating said object in association with said compilation system at a compile-time;
   executing and generationally garbage collecting said object in association with said compilation system at a run-time;
   referencing said object by an interior pointer; and
   allocating a portion of memory from said resources for said interior pointer at said compile-time thereby facilitating said generational garbage collection of said object at said run-time by referencing said interior pointer.

8. The method as set forth in claim 7, further comprising:
   operating said computer system with threading; and
   threading said object and thereby facilitating said generational garbage collection of said threaded object.

9. The method as set forth in claim 7, said object having a plurality of instructions; said method further comprising:
   wherein said referencing said object by an object pointer step including:
      pre-defining an order for said instructions;
      referencing said instructions in said pre-defined order;
      initiating said referencing of said instructions at a first instruction; and
      continuing said referencing of said instructions at an interior instruction, said interior instruction being after said first instruction in said pre-defined order; and said object pointer referencing said interior instruction; and
   storing in said resources for said object pointer a distance between said first instruction and said interior instruction, thereby facilitating safe said generational garbage collection of said object by referencing said object pointer.

10. The method as set forth in claim 7, further comprising; selectively allocating said resources for said object pointer when said object pointer will be generationally garbage collected at said run-time thereby selectively using said resources of said computer system.

11. The method as set forth in claim 7, said object having a plurality of instructions; said method further comprising:
   wherein said referencing said object by an object pointer step including:
      pre-defining an order for said instructions; and
      initiating said referencing of said instructions at a first instruction, and said object pointer referencing said first instruction; and
   storing an identification of said object pointer with said first instruction in said resources for said object pointer, thereby facilitating safe said generational garbage collection of said object by referencing said object pointer.

12. The method as set forth in claim 7, further comprising; locking said object when said object is being generationally garbage collected thereby serially generationally garbage collecting said object at said run-time.

13. An article of manufacture comprising a program storage medium having computer readable program code embodied therein for pre-allocating resources in a computer system; said computer system having computer readable program code for an object, and computer readable program code for a compilation system; said article of manufacture comprising:
   computer readable program code for operating said object in association with said compilation system at a compile-time;
   computer readable program code for executing and generationally garbage collecting said object in association with said compilation system at a run-time;
   computer readable program code for referencing said object by an interior pointer; and
   computer readable program code for allocating a portion of memory from said resources for said interior pointer at said compile-time thereby facilitating said generational garbage collection of said object at said run-time by referencing said interior pointer.

14. The article of manufacture as set forth in claim 13, said object having computer readable program code for a plurality of instructions; said article of manufacture further comprising:
   computer readable program code for pre-defining an order for said instructions;
   computer readable program code for referencing said instructions in said pre-defined order;
   computer readable program code for initiating said referencing of said instructions at a first instruction;
   computer readable program code for continuing said referencing of said instructions at an interior instruction, said interior instruction being after said first instruction in said pre-defined order; and said object pointer referencing said interior instruction; and
   computer readable program code for storing in said resources for said object pointer a distance between said first instruction and said interior instruction, thereby facilitating safe said generational garbage collection of said object by referencing said object pointer.

15. The article of manufacture as set forth in claim 13, said object having computer readable program code for a plurality of instructions; said article of manufacture further comprising:
   computer readable program code for pre-defining an order for said instructions;

computer readable program code for initiating said referencing of said instructions at a first instruction, and said object pointer referencing said first instruction; and computer readable program code for storing an identification of said object pointer with said first instruction in said resources for said object pointer, thereby facilitating safe said generational garbage collection of said object by referencing said object pointer.

16. A computer readable memory device encoded with a data structure having entries, for pre-allocating resources in a computer system having an object entry, and a compilation system entry; said memory device comprising:

wherein said compilation system entry being operable during compile-time and during run-time;

said object entry operating in association with said compilation system entry at said compile-time; and said object entry being generationally garbage collected in association with said compilation system entry at said run-time;

an interior pointer entry referencing said object entry; and said resources being allocated for said interior pointer entry at said compile-time thereby facilitating said generational garbage collection of said object entry at said run-time by reference to said interior pointer entry.

17. The computer readable memory device as set forth in claim 16, further comprising:

wherein said object entry having a plurality of instruction entries in a pre-defined order;

a starting instruction entry being first in said pre-defined order;

an interior instruction entry being after said first instruction entry in said pre-defined order and said object pointer entry referencing said interior instruction entry of said object entry; and an offset instruction entry representing a distance between said starting instruction entry and said interior instruction entry and said offset instruction entry being stored in said resources for said object pointer entry, thereby facilitating safe said generational garbage collection of said object entry by reference to said object pointer entry.

18. The computer readable memory device as set forth in claim 16, further comprising:

wherein said object entry having a plurality of instruction entries in a pre-defined order;

a first instruction entry being first in said pre-defined order and said object pointer entry referencing said first instruction entry; and an identification instruction entry representing said first instruction entry being referenced by said object pointer entry, and said identification instruction entry being stored in said resources for said object pointer entry, thereby facilitating safe said generational garbage collection of said object entry by reference to said object pointer entry.

* * * * *